(No Model.)

H. ALLIGER.
COVER FOR RECEPTACLES.

No. 458,264. Patented Aug. 25, 1891.

WITNESSES:
J. H. Thebenath.
C. Sedgwick.

INVENTOR:
H. Alliger
BY Munn & Co.
ATTORNEYS

UNITED STATES PATENT OFFICE.

HASBROUCK ALLIGER, OF RONDOUT, NEW YORK.

COVER FOR RECEPTACLES.

SPECIFICATION forming part of Letters Patent No. 458,264, dated August 25, 1891.

Application filed November 24, 1890. Serial No. 372,449. (No model.)

*To all whom it may concern:*

Be it known that I, HASBROUCK ALLIGER, of Rondout, in the county of Ulster and State of New York, have invented a new and useful Improvement in Covers for Receptacles, of which the following is a full, clear, and exact description.

My invention relates to an improved cover for receptacles such as condensed-milk cans, cups, tumblers, goblets, and similar articles, which ordinarily are not provided with covers capable of being moved from side to side.

The object of the invention is to provide a cover capable of being expeditiously and conveniently attached to a receptacle and removed therefrom, and to so construct the cover that it may be readily moved laterally to disclose the contents of the receptacle or to conceal the same.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
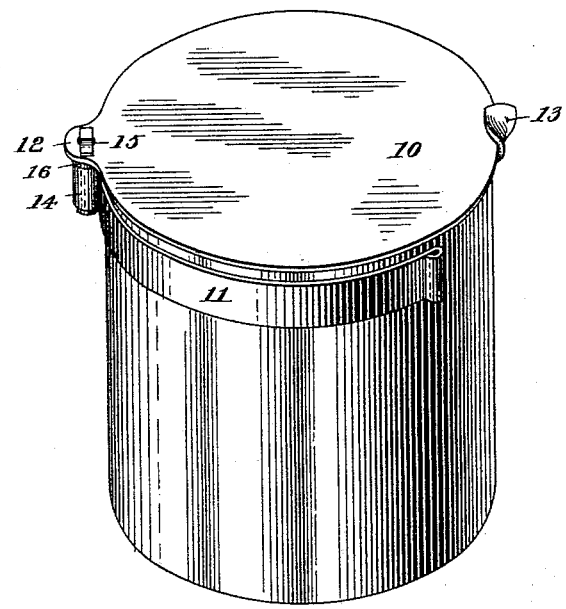
Figure 2:
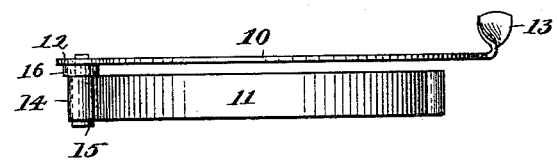
Figure 3:
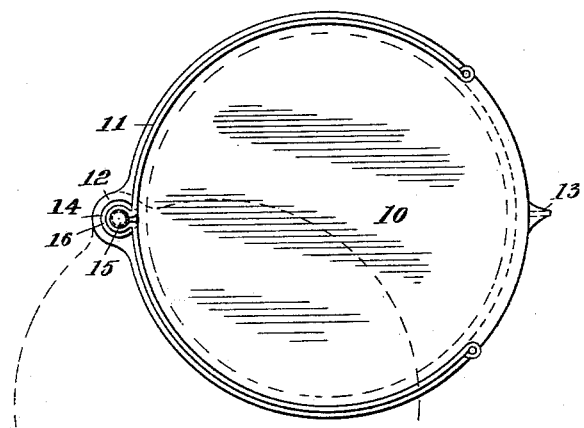

Figure 1 is a perspective view of a can having my improved cover applied. Fig. 2 is a side elevation of the cover detached, and Fig. 3 is a bottom plan view of the same.

The cover comprises, primarily, a lid 10 and a clip 11. The lid is preferably made of metal and shaped to conform to the contour of the top of the vessel to be covered, or practically so. Ordinarily, however, the lid is of disk form, as illustrated, and is provided at one side with an extension 12 of the periphery and at its opposite side with a knob 13 or equivalent vertical projection capable of being readily pressed or grasped with the fingers or thumb of the operator's hand. The clip 11 may be made of any material possessing the qualities of a spring—as, for instance, rubber or metal, the latter in band or wire form. Ordinarily, however, the clip, as illustrated in the drawings, consists of a band of spring metal, bent to semicircular shape and provided at or near its center with an exterior eye 14, the lid being pivotally connected with the band by a pin or pintle 15, attached at one end to the extension 12 of the lid and passed down through the eye of the band, the lower end of the pin having a head formed thereon; or said end may be otherwise enlarged. The lid is elevated some distance from the clip by a washer 16, located immediatly below the lid around the pintle; or said washer may be substituted by a collar integral with or attached to the lid. To place the cover upon a vessel, the clip is made to engage with its outer surface sufficiently near the top to permit the lid to just engage with the upper edge, as shown in Fig. 1.

It is evident that a cover of the character described is very useful in connection with cups, tumblers, condensed-milk cans, and like vessels, as it effectually protects the contents, renders the same easy of access, and, further, the device may be very quickly and conveniently applied or removed.

Having thus described my invention, I claim as new and desire to secure by Letters Patent—

1. A removable cover for receptacles, consisting of a curved spring-clip bent at its middle to form a vertical eye, and a lid pivoted to the clip by a pintle passed through the eye of the clip, substantially as described.

2. A removable cover for receptacles, consisting of a curved spring-metal strip bent at its middle to form a vertical eye, a lid provided with an apertured extension, and a pintle passed through the apertured extension of the lid and the eye of the strip, substantially as described.

3. In a removable cover for receptacles, the combination, with a spring-clip provided with an eye, of a lid located above the clip and provided with a knob-extension, a vertical pintle pivotally connecting the lid and clip, and a washer interposed between the eye of the clip and the lid and surrounding the pintle, substantially as specified.

HASBROUCK ALLIGER.

Witnesses:
JENNIE E. ALLIGER,
JNO. B. ALLIGER.